United States Patent [19]
Kita

[11] Patent Number: 5,547,146
[45] Date of Patent: Aug. 20, 1996

[54] APPARATUS FOR WINDING A MAGNETIC TAPE ON A FLANGED REEL

[75] Inventor: Akihisa Kita, Kanagawa, Japan

[73] Assignee: Fuji Photo Film Co., Ltd., Kanagawa, Japan

[21] Appl. No.: 853,074

[22] Filed: Mar. 17, 1992

[30] Foreign Application Priority Data

Mar. 18, 1991 [JP] Japan .................................... 3-077110

[51] Int. Cl.$^6$ .............................. B65H 18/26; G11B 5/84
[52] U.S. Cl. ........................................................ 242/548.4
[58] Field of Search ............................... 242/67.1 R, 71.8

[56] References Cited

U.S. PATENT DOCUMENTS

| | | | |
|---|---|---|---|
| 3,620,474 | 11/1971 | Ray | 242/71.8 X |
| 3,627,230 | 12/1971 | Wagerin | 242/195 |
| 3,749,328 | 7/1973 | Dusenbery | 242/67.1 R |
| 3,819,124 | 6/1974 | Marks et al. | 242/71.8 |
| 4,789,110 | 12/1988 | Sakaguchi et al. | 242/67.1 R |
| 4,838,496 | 8/1989 | Kubota et al. | 242/67.1 R |
| 4,842,210 | 6/1989 | Kubota et al. | 242/67.1 R |
| 4,867,388 | 9/1989 | Sakaguchi et al. | 242/67.1 R |
| 4,932,600 | 6/1990 | Usui et al. | 242/67.1 R |

FOREIGN PATENT DOCUMENTS

| | | | |
|---|---|---|---|
| 0053514 | 4/1979 | Japan | 242/71.8 |
| 61-51642 | 3/1986 | Japan . | |
| 1150630 | 4/1969 | United Kingdom . | |

*Primary Examiner*—Daniel P. Stodola
*Attorney, Agent, or Firm*—Sughrue, Mion, Zinn, Macpeak & Seas

[57] ABSTRACT

A apparatus for winding a magnetic tape using a tape winding member involves setting the distance W between the inner surfaces of upper and lower flanges of the member and the width w of the tape in the following relationship:

$$w \leq w + 0.16w.$$

Further, either the tape winding velocity is set at least 5 m/sec. or compressed air is fed onto the tape as it is wound, so as to ensure that the tape does not rub against the inside edges of the tape winding member's flanges during winding.

3 Claims, 5 Drawing Sheets

APPARATUS FOR WINDING A MAGNETIC TAPE ON A FLANGED REEL

FIELD OF THE INVENTION

The present invention relates to a method for winding a magnetic tape in a roll of tape, particularly to the method for winding the magnetic tape slit into narrow tapes out of a parent roll of wide magnetic tape onto the flanged reel in a predetermined length.

BACKGROUND OF THE INVENTION

In a magnetic tape manufacturing process, there are usually three kinds of ways and means to wind or rewind the narrow magnetic tape on the flanged reel. First, the narrow magnetic tape may be wound on the flanged reel in a relatively short and predetermined length out the roll of a relatively long magnetic tape having the same width as that of the magnetic tape wound on the flanged reel. Second, the narrow magnetic tape may be wound on the flanged reel in a relatively short and predetermined length by slitting the parent roll of a relatively longer and wider than that of the magnetic tape wound on the flanged reel into narrow tapes. Third, the narrow magnetic tape may be rewound on the flanged reel in a roll out of another roll of a magnetic tape having the same width and length as that of the magnetic tape rewound on the flanged reel. During winding the magnetic tape in such ways and means as described above, the vibrations of the magnetic tape at the winding point where the uppermost layer of the magnetic tape of the tape roll comes into contact with the forthcoming magnetic tape in the direction of its width and/or thickness, what is called the behavior of the magnetic tape, sometimes take a change for the worse due to their physical properties of both the wide magnetic tape and the narrow magnetic tape. The change in the behavior of the magnetic tape causes the roll of narrow magnetic tape wound on the flanged reel to worsen the appearances of the end face of the tape roll. The appearances of the winding depend on whether the rugged surface or irregular profile exists on the end face of the tape roll. The faster the magnetic tape is wound, the poorer the appearances of the winding become.

The unneat winding having the poor appearances is likely to cause the magnetic tape serious troubles such as deterioration of the electromagnetic conversion properties. If the magnetic tape is used for a video tape cassette to record in high density, such an unneat winding is advantageous because audio signal and synchronizing signal but video signal are recorded along the side edge of the magnetic tape. For that reason, all the rolls of the magnetic tape had to be inspected their appearances by eyesight or the like before assembling the video tape cassette.

Such an inspection, however, requires a lot of labors and time, thereby causing impediment to succeed in the conventional process. In order to avoid such a manual inspection, various methods for neatly winding the magnetic tape have been proposed. Those methods proposed can be broadly sorted into two types. In one of two types, an endless flexible belt made of rubber, polyimide resin or the like is driven in the radial direction of the roll of the narrow magnetic tape wound on the flanged reel, pressing its flat surface resiliently upon the surface of the uppermost magnetic layer of the roll of the same. In the other, a soft belt made of a non-woven fabric sheet is provided at the gap between the inner surface of the flange integrated with the hub and the side edge of the narrow magnetic tape wound on the hub so as to press its soft surface resiliently upon the end face of the roll of the same, extending over in the radial direction of the end face.

Since the endless and soft belt are put in contact with the magnetic tape, the ingredients of such belts and magnetic tape are likely to be scraped off from their substrates, be scattered and then adhere to the magnetic tape to cause serious defects such as the drop out of reproduction out-put. The stronger than needs the pressing force of such belts becomes, the more troubles such as the deformation or damages to the side edge of the magnetic tape occur. Thus such proposed methods could not fill sufficiently the primary functions and objects thereof. Moreover, since the main parts of the apparatus in accordance with such methods are subject to be worn down during use, the apparatus is at disadvantage in its running and/or maintaining cost. Besides, the structure of the apparatus is complicated because the apparatus has to replace the expired or fully wound tape rolls with the new ones by utilizing a shuttle means movable between their operational station and the non-operational station. Furthermore, since it takes much time to complete the above described replacement of the rolls, it prevents the productivity of winding the magnetic tape operation from raising more.

In order to solve such problems, various methods recently are being proposed, for example: one is to apply a magnetic field generated with a magnet to the roll of the narrow magnetic tape wound on the reel in the width direction of the tape. However, according to the method utilizing the magnetic field, it is inevitable for the side edge of the narrow magnetic tape to rub against the inner surface of the flange integrated with the hub due to the magnetic attraction by the magnet, thereby generating numerous scrapings which cause the drop out of reproduction out-put.

SUMMARY OF THE INVENTION

The present invention was made in consideration of those circumstances. Accordingly, it is an object of the invention to provide a method for winding a magnetic tape on a flanged reel so that the occurrence of an unneat winding and a rubbing of the side edge of the tape and the inner surface of the flange may be avoided regardless of the behavior of the magnetic tape.

In an embodiment of the method of the present invention, during a narrow magnetic tape is wound in roll shaped on a tape winding core member comprising a pair of upper and lower flanges and a hub, a magnetic field is applied to the narrow magnetic tape being just wound in roll shaped on the reel so as to attract the tape in the width direction of the same. A distance W between the inner surfaces of the flanges of the reel and a width w of the narrow magnetic tape are set in a relation of $W \leq w+0.16w$, wherein a winding velocity of the narrow magnetic tape is set of 5 m/sec, so as to prevent the side edge of the narrow magnetic tape from coming in contact with the inner surfaces of the flanges during winding. In this way, the scrapings or fine particles discussed above are not generated.

In addition to the embodiment of the method of the present invention, another embodiment of the invention contains an additional feature which compressed air is fed into the tape winding point where the uppermost layer of the roll of the narrow magnetic tape comes into contact with the forthcoming narrow magnetic tape fed from the supply roll of the magnetic tape, and is then discharged from the air gap formed between the side edges of the narrow magnetic tape and the inner surfaces of the flanges to ambient atmospheres.

DETAILED DESCRIPTION OF THE PREFERRED EMBODIMENT

Figure 1:
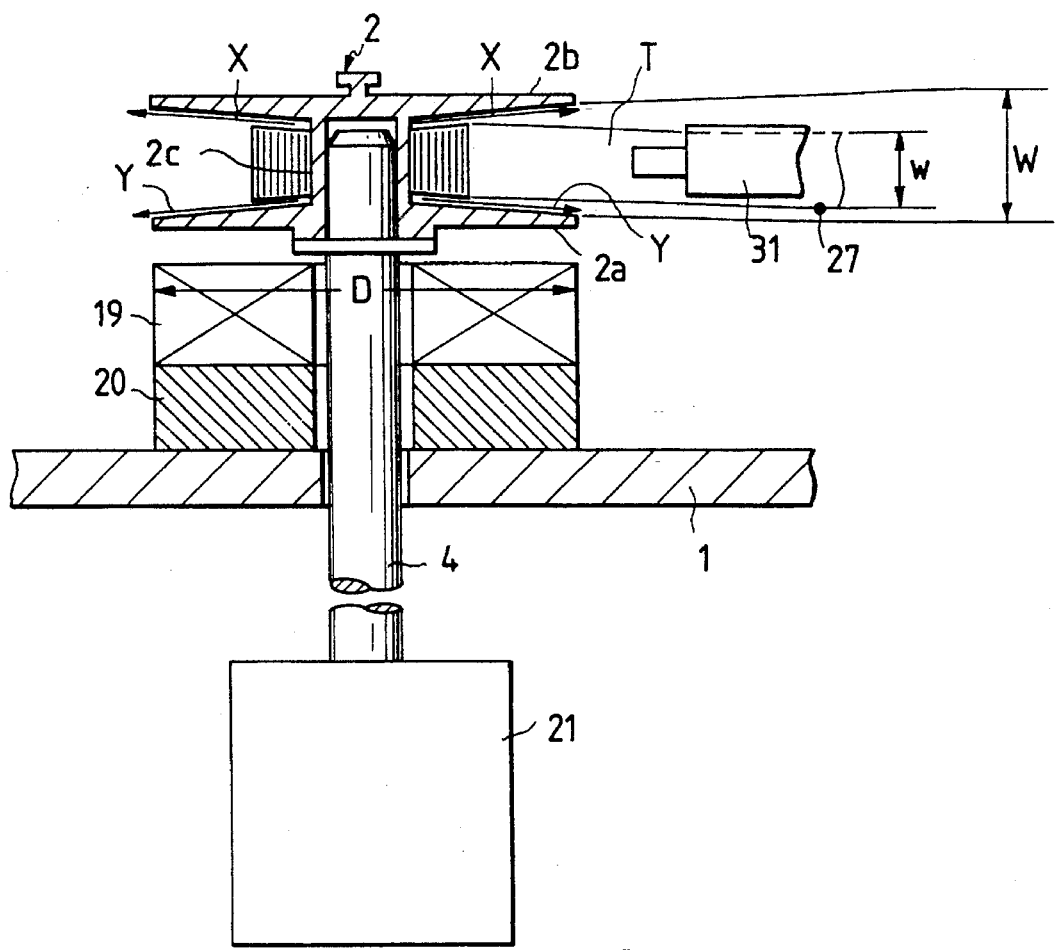
FIG. 1 is an enlarged sectional view of a primary portion of a magnetic tape winder for practicing a method which is an embodiment of the present invention.

An embodiment of the present invention will now be described with references to FIGS. 1, 2, 3 and 4. The magnetic tape winder 1 shown in FIGS. 3 and 4 comprises a pair of tape winding core members 2 and 3 which are used for tape reels to be incorporated in a video tape cassette later, a pair of driving shafts 4 and 5, a supply roll of the magnetic tape, a tape travelling path system 8, a tape cutting and splicing means 9, a permanent magnet 19 (refer to FIG. 4), a driver 21 such as electric motor (refer to FIG. 1) and a compressed air nozzle 31.

Figure 3:
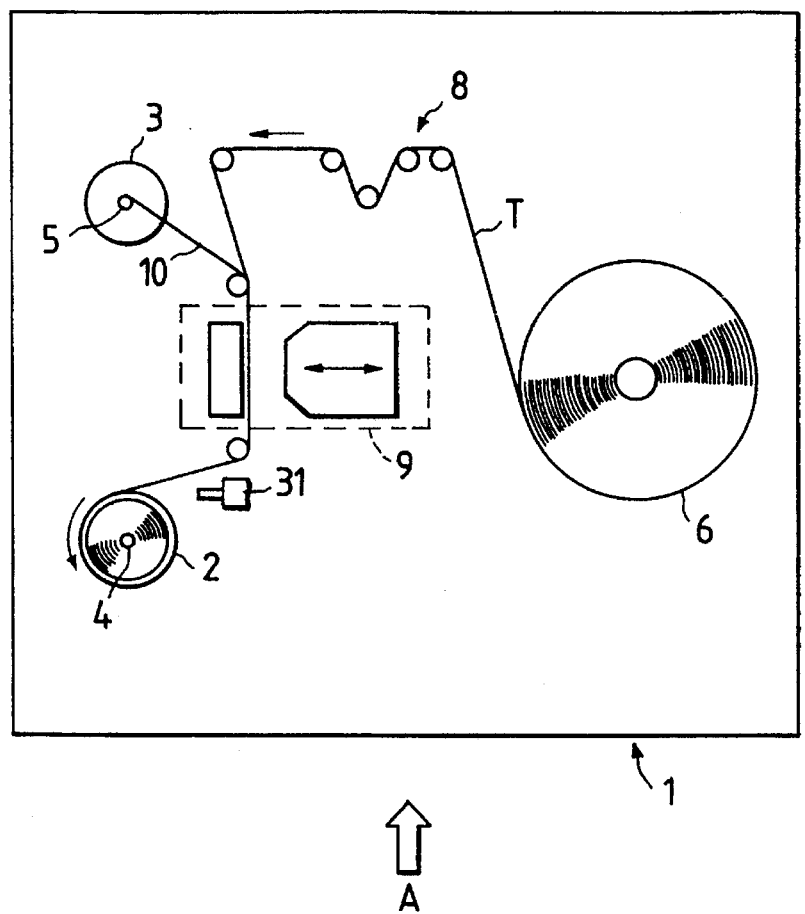
FIG. 3 is a plan view of the whole winder according to the invention.
Figure 4:
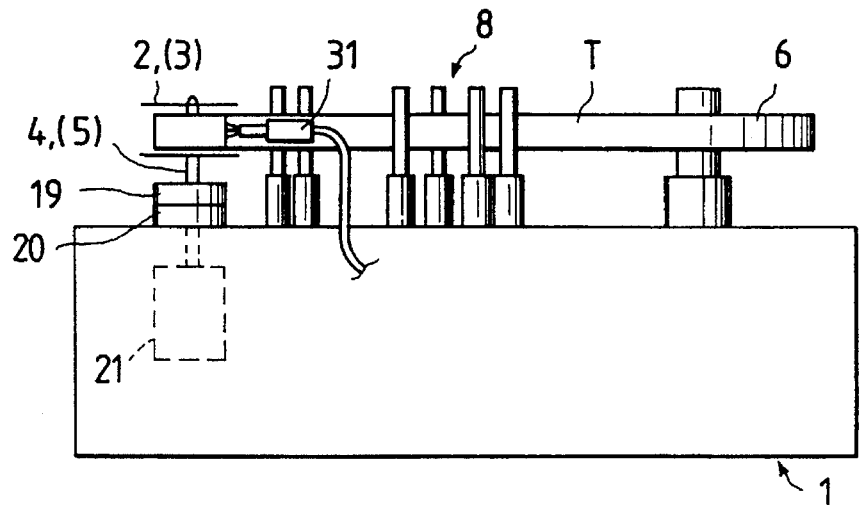
FIG. 4 is a side view of the winder seen along an arrow A shown in FIG. 3.

Prior to the operation of the winder 1, the reels 2 and 3 are linked each other with a leader tape 10 of a predetermined length (only a standing leader tape 10 is shown in FIG. 3). In operation, first, the reels 2 and 3 are mounted on the driving shafts 4 and 5 respectively, and then the leader tape 10 linking each of reels 2 and 3 is cut off at the mid point thereof. After being cut off, the leading end portion of the leader tape 10 adjacent to the reel 2 is joined to the leading end portion of the narrow magnetic tape T fed from the supply roll of the magnetic tape with a proper splicing tape or the like, while the trailing end portion of the leader tape 10 adjacent to the reel 3 is held securely to a standing position as shown in FIG. 3. When the diameter of the roll of the narrow magnetic tape T wound on the reel 2 reaches a predetermined value, the narrow magnetic tape T being wound on the reel 2 is cut off, and then the trailing end portion of the narrow magnetic tape T is joined to the trailing end portion of the leader tape 10 ready to joining at the standing position with the same splicing means as that of the leading end portion of the leader tape 10. The operations of cutting both the leader tape 10 and the narrow magnetic tape T and splicing the leader tape 10 to the narrow magnetic tape T v.v. are conducted with the tapes cutting and splicing means 9 comprising tapes holder, tapes cutter and tapes splicer. The compressed air nozzle 31 is provided near the reel 2 so as to feed a compressed air into the tape winding point where the uppermost layer of the roll of the narrow magnetic tape T comes into contact with the forthcoming narrow magnetic tape T fed from the supply roll of the magnetic tape T. It is preferable for the air compressed with an air compressor (not shown) to be purified with an air filler (not shown) prior to being fed into the compressed air nozzle 31.

The principal portion of the winder 1 will be described hereinafter in detail with reference to FIGS. 1 and 2. The permanent magnet 19 and made of a rare earth metal and shaped like a doughnut or flat ring is provided around the driving shaft 4 whose upper end portion is engaged with the center hole of the reel 2. The magnet 19 is supported with a support member 20 secured to the framework of the winder 1 so as to be positioned beneath the lower flange 2a of the reel 2. It is preferable that the diameter D of the magnet 19 is larger than the maximum diameter of the roll of the narrow magnetic tape T wound on the reel 2. The magnetic field of the magnet 19 is directed substantially in parallel with the axis of the driving shaft 4. The lower end portion of the driving shaft 4 is being extended through the center hole of the magnet 19 and the support member 20 in turn, and then is coupled to the driver 21. Each of the flanges 2a and 2b has a tapering inner surface gradually reduced the thickness thereof from the center portion to the outer peripheral portion. If the narrow magnetic tape T is 12.65 mm in width (w) like a half-inch format tape, the distance (W) between the inner surface of the flanges 2a and 2b is set at a width of 13.7 mm at the outer peripheral edges of the flanges 2a and 2b, while the effective width of the hub 2c is 13.4 mm.

Now the roll of the narrow magnetic tape T wound on the reel 2 will be discussed. During the narrow magnetic tape T is being wound on the reel 2, the magnetic tape T is magnetically attracted toward the magnet 19. When the tape winding velocity of the narrow magnetic tape T is lower than 5 m/sec, the side edge of the narrow magnetic tape T comes into contact with the inner surface of the lower flange 2a because the magnetic field of the magnet 19 is able to work completely due to nonexistence of accompanying air films with the narrow magnetic tape T in the roll of magnetic tape layers in such a tape winding speed condition. If the tape winding velocity is 5 m/sec or more, the side edge of the narrow magnetic tape T does not come into contact with the inner surface of the lower flange 2a because the air gap is formed between the side edge of the narrow magnetic tape T and the inner surface of the lower flange 2a due to the existence of accompanying air films with the narrow magnetic tape T in the roll of magnetic tape layers in such tape winding speed conditions.

Figure 2:
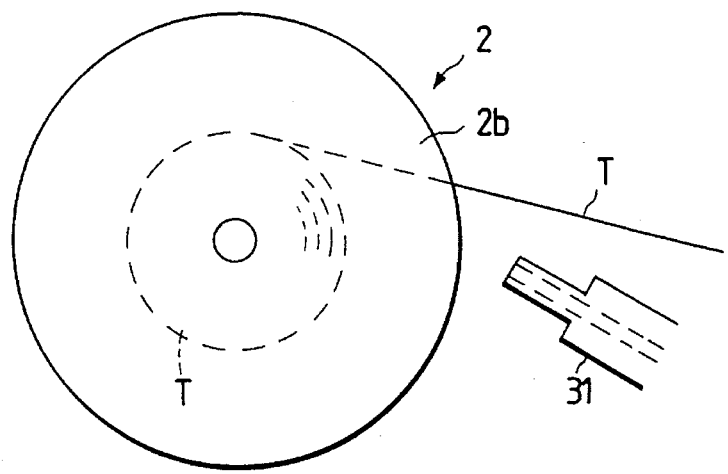
FIG. 2 is an enlarged plan view of a primary portion of the winder shown in FIG. 1.

The air trapped between the magnetic tape layers is squeezed and discharged to the area where the side edges of the narrow magnetic tape T come into contact with the inner surfaces of the flanges 2a and 2b, thereby generating two kinds of air laminar flows in the direction of arrow X and Y shown in FIG. 1, as the number of magnetic tape layers in the roll of the narrow magnetic tape T increases. The air laminar flows generated with the discharged air make the side edge of the magnetic tape T and the inner surface of the flange separate each other by imposing the pressure of the air laminar flows, thereby generating small but stable air gaps between such members.

Accordingly, although the narrow magnetic tape T being wound on the reel 2 is magnetically attracted toward the magnet 19 located beneath the lower flange 2a, the air gap formed with the discharged air (shown by arrow Y in FIG. 1) prevents the side edge of the narrow magnetic tape T wound on the reel 2 from coming into contact with the inner surface of the lower flange 2a by keeping both the air pressure of the air gap and the attractive force of the magnet 19 in an equilibrium.

In this way, it has been found that the higher the tape winding velocity becomes, the more the volume of the discharged air increases. Thus, in order to keep the air pressure of the air gap stable under the condition in which the difference between the distance W and the width w of narrow magnetic tape T be set smaller, it is preferable to wind the narrow magnetic tape T at the rate of 5 m/sec or more. Naturally, the smaller the air gap is set, the higher the air pressure of the air gap increases. For that reason, it is preferable to set the air gap at the smaller width.

The results of various experiments and investigations conducted by the inventor have proved that the narrow magnetic tape T wound on the reel 2 shows a neat appearance on the end face of the roll of the magnetic tape T when the above-mentioned difference between the distance W and the width w satisfies the following relationship, that is $W \leq +0.16w$, wherein W is the distance between the inner surfaces of the flanges 2a and 2b, and w is the width of the narrow magnetic tape T. The results of this experiments and investigations have also proved that it is preferable to feed compulsorily the compressed air into the tape winding point described above because the volume of the air discharged out of the magnetic tape layers increases, thereby increasing the pressure of the air gap. As a result, it is possible to wind the narrow magnetic tape T at the relatively low velocity such as lower than 5 m/sec. because there are the discharged air enough to moderately cancel the attractive force of the magnet 19 even if at such a velocity. The quantity of the compressed air flow fed into the tape winding point usually may be set at $10 \times 10^{-3}$ to $200 \times 10^{-3}$ m$^3$/min. A plurality of the compressed air nozzle 31 also may be used. It is preferable but not essential that the form of the air blowing openings of the nozzle 31 resemble slit in shape extending in parallel with the width direction of the narrow magnetic tape T.

The present invention is not limited to the above-described embodiment, but may be embodied or practiced in other various ways without departing the spirit and scope of the invention. For example, the permanent magnet 19 may be replaced with an electromagnet variable its strength of magnetic field by adjusting the current intensity. Another permanent magnet may be suitably provided at a proper portion in the tape traveling path system 8 to apply the magnetic field to the traveling magnetic tape T in the width direction of the tape T, thereby eliminating the lateral (width direction) vibration of the tape T and thus stabilizing its runnability of the tape T traveling in the path system 8. Although the winder 1 uses a pair of reels 2 and 3 (the so-called "open-reel type"), the winder 1 may be applied to the in-cassette winding system which the empty reels 2 and 3 are incorporated in the tape cassette prior to winding. Moreover, the winder 1 may be applied to the tape slitting and winding system which a wider and longer magnetic tape is slit into a plurality of narrow tapes, and the narrow tapes are wound on each of reels, respectively.

According to the present invention, since the distance W between the inner surface of the flanges integrated with a hub member and the width w of the narrow magnetic tape wound on the hub member are set in a relation described above, the narrow magnetic tape is wound at the rate of 5 m/sec. or more, and the compressed air is fed into the tape winding point compulsorily, the narrow magnetic tape being wound on the reel is prevented from coming into contact with the inner surface of the flanges due to the air gap formed with the air discharged out of the tape layers in the tape roll.

Consequently, the occurrence of the scrapings which cause the drop out of reproduction out-put may be avoided, and the narrow magnetic tape may be not only wound on the reel, but also the qualitative reliability of the roll of the magnetic tape is enhanced.

Furthermore, since the narrow magnetic tape may be neatly wound, inspecting the appearance of the end face of the tape roll by eyesight may be avoided to improve its operations efficiency.

Actual examples of the embodiment of the present invention are hereafter described to clarify the new effects of the invention.

Magnetic coating liquids A and B whose compositions are shown in Tables 1 and 2 were put in ball mills, respectively, and then kneaded and dispersed for a time of 10.5 hours. Table 2 shows the $S_{BET}$ values of the magnetic powders, the quantities of the vinyl chloride and vinyl acetate copolymers, and the urethanes as main binders used in the liquids A and B. The liquid A was used for a VHS format magnetic tape and the liquid B was used for an 8-mm video magnetic tape, respectively.

The magnetic coating liquid was applied to a polyethylene terephthalate film of 15 μm in thickness and 1 m in width to manufacture a wider parent tape. The parent tape was slit into the VHS-format magnetic tapes each having a width of one-half inch.

TABLE 1

| | |
|---|---|
| Magnetic substance (magnetic powder of $\gamma$-Fe$_2$O$_3$ or magnetic powder of metal) | 100 parts by weight |
| Vinyl chloride and vinyl acetate copolymer (containing sodium sulfonate and epoxy group) | X parts by weight |
| Urethane (polyurethane containing sulfonic acid group) | Y parts by weight |
| Hardener (Coronate L made by Nippon Polyurethane Industry Co.) | 5 parts by weight |
| Stearic acid | 0.5 part by weight |
| Oleic acid | 0.5 part by weight |
| Butyl stearate | 1 part by weight |
| Carbon black (80 mμ in mean grain diameter) | 1 part by weight |
| Abrasive ($\alpha$-Al$_2$O$_3$) | 10 parts by weight |
| Methyl ethyl ketone | 180 parts by weight |
| Cyclohexane | 120 parts by weight |

TABLE 2

| Magnetic liquids | $S_{BET}$ value (m$^2$/g) of magnetic powders | Quantity X (parts by weight) of vinyl chloride and vinyl acetate copolymer | Quantity Y (parts by weight) of urethane | Magnetic substance |
|---|---|---|---|---|
| A | 30 | 5.0 | 2.5 | Magnetic powder of $\gamma$-Fe$_2$O$_3$ |
| B | 45 | 7.5 | 3.75 | Magnetic powder of metal |

Each of the magnetic tapes was wound on a reel under conditions mentioned hereafter. The winder shown in FIGS. 1, 2, 3 and 4 was used to wind the magnetic tape. The winding was conducted by feeding the compressed air from the compressed air nozzle into the tape winding point near the reel.

Conditions of tape winding

The tension of the magnetic tape was gradually tapered to be 100 g at the start of the winding to 75 g at the end thereof.

The velocity of the winding was 3 to 15 m/sec.

The material of the permanent magnet was a samarium-cobalt material.

The coercive force of the magnet was 9,800 Oe.

The difference between the width of the magnetic tape and the distance between the inner surfaces of the upper and the lower flanges, which was set at 4.0 mm, 3.0 mm, 2.5 mm, 2.0 mm, 1.5 mm, 1.0 mm and 0.5 mm.

The length of the wound magnetic tape was 247 m.

The quantity of the compressed air flow from the nozzle to the tape was $15 \times 10^{-3}$ m$^3$/min.

Figure 5:
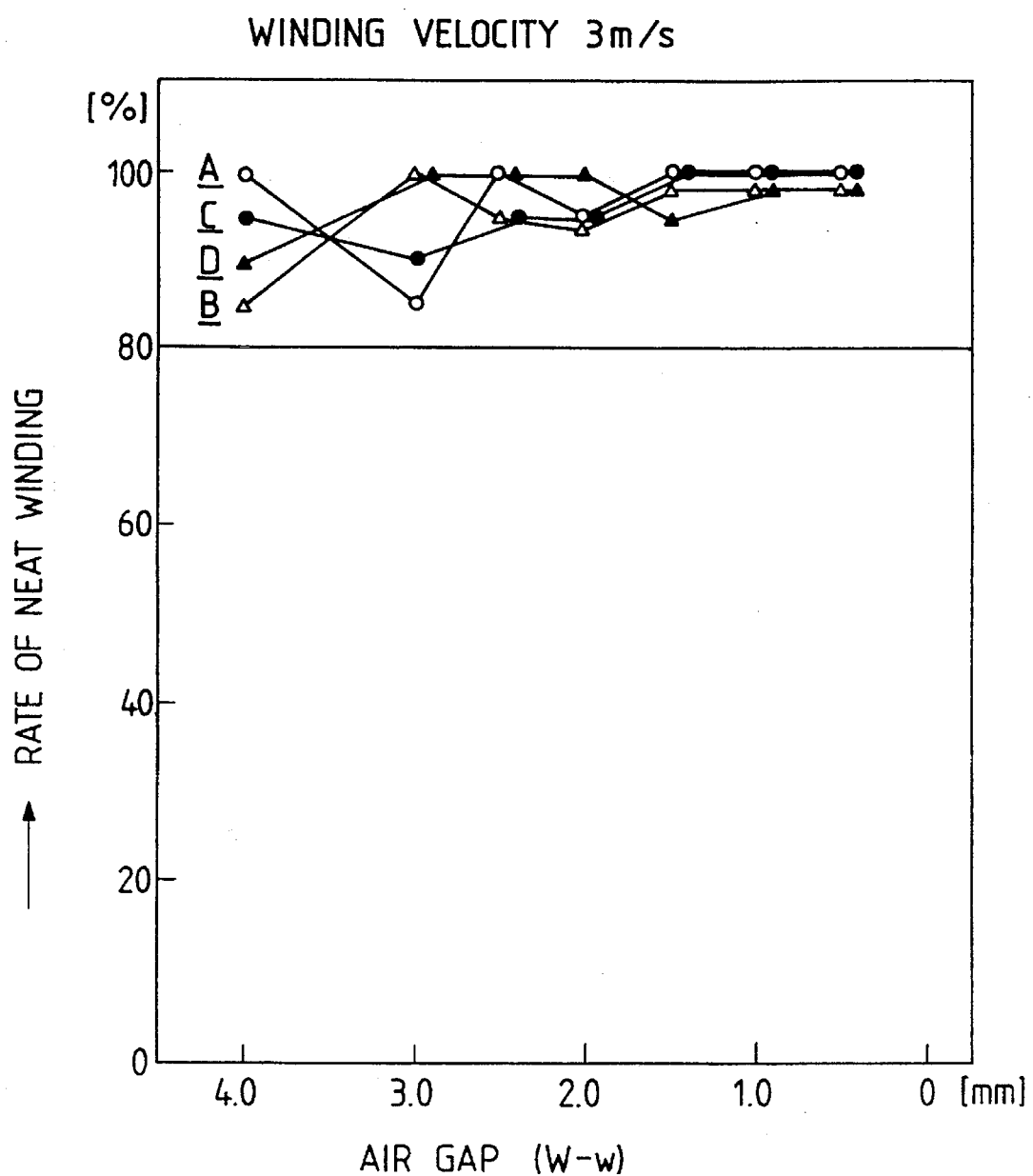
FIG. 5 is a graph showing the relationship between the rate of the neat winding of the narrow magnetic tape and the air gap between the width w and the distance W as described above at a tape winding velocity of 3 m/sec.
Figure 6:
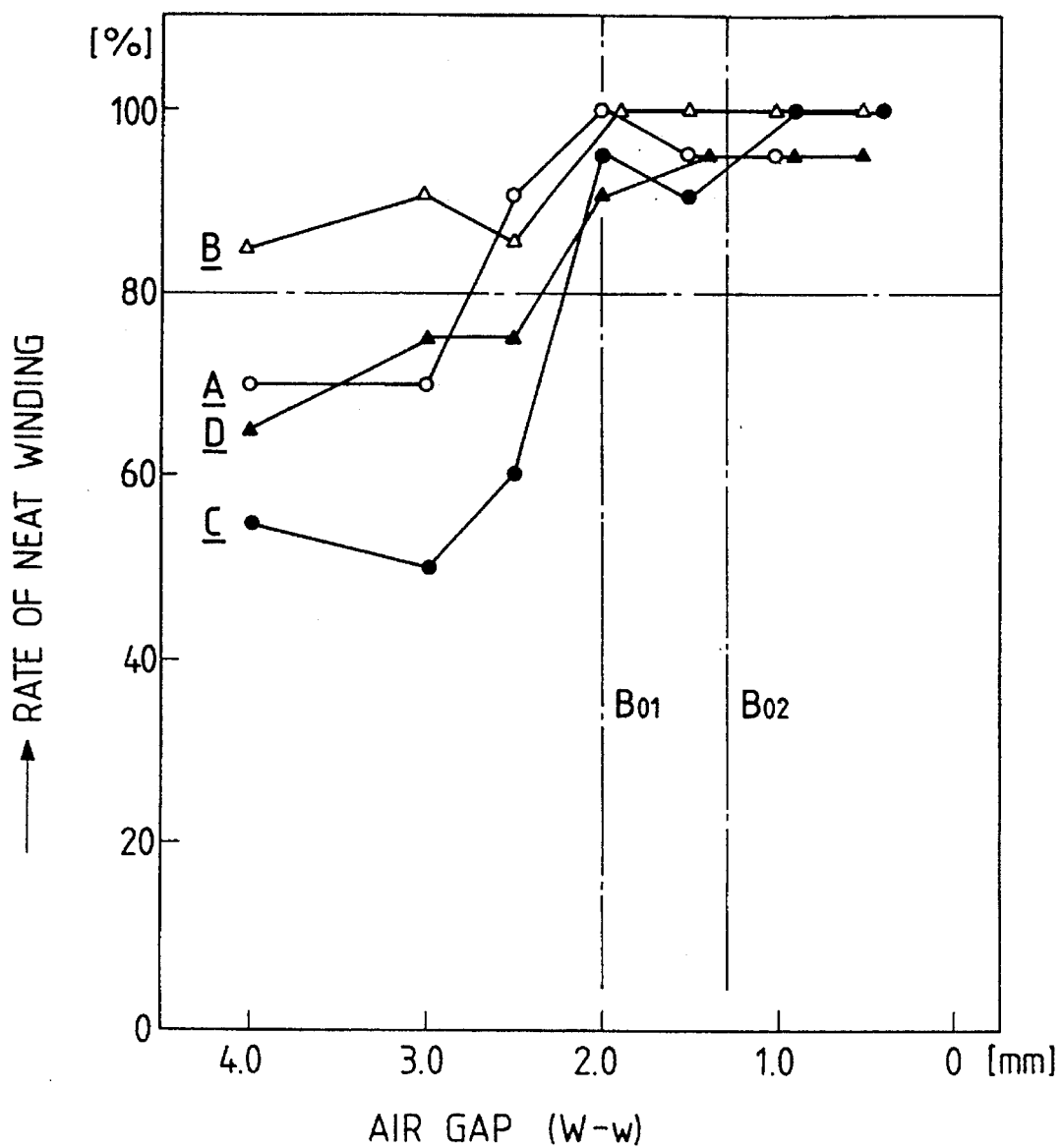
FIG. 6 is a graph showing the relationship between the rate of the neat winding of the narrow magnetic tape and the air gap between the width w and the distance W as described above at a tape winding velocity of 5 m/sec.
Figure 7:
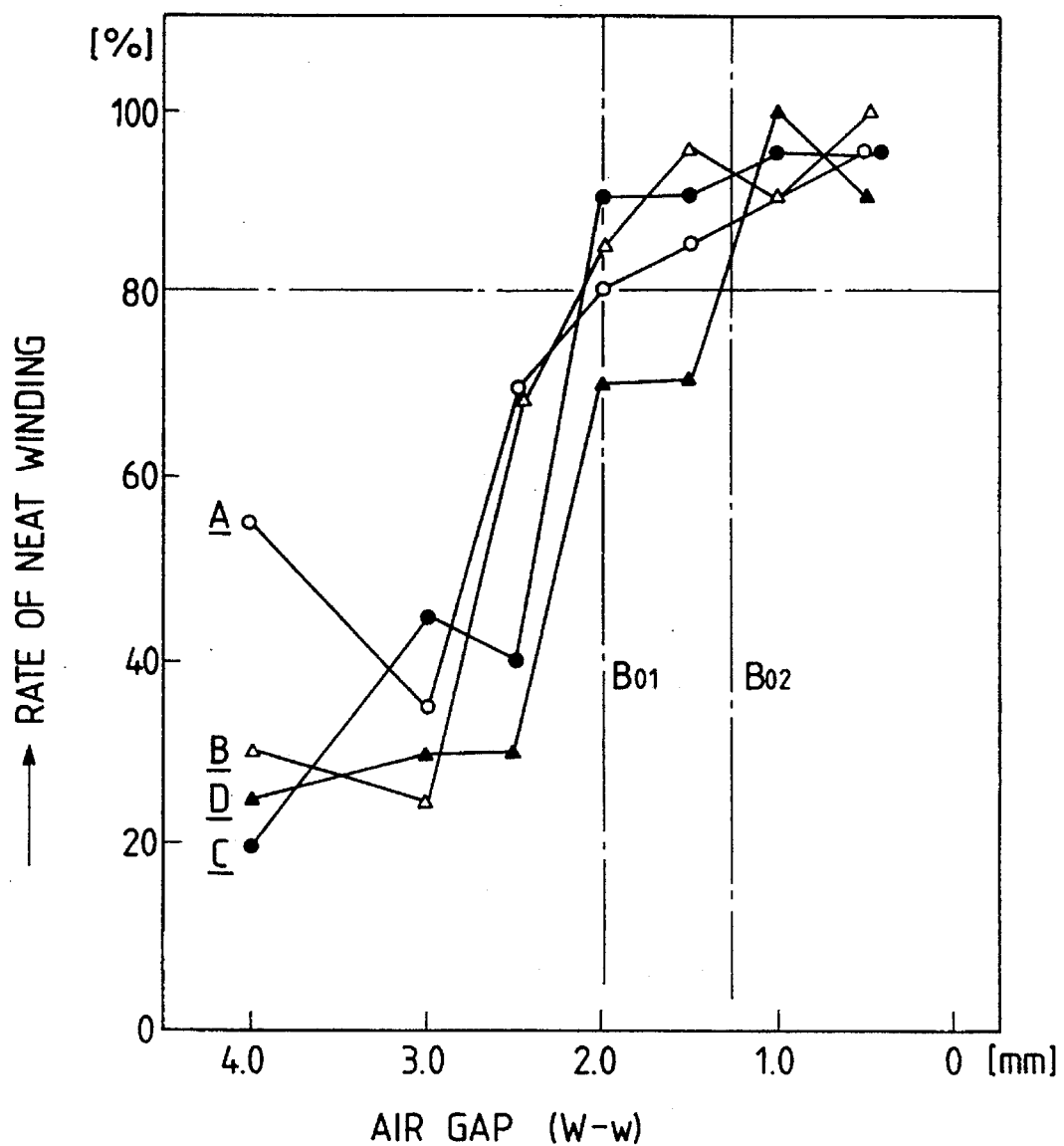
FIG. 7 is a graph showing the relationship between the rate of the neat winding the narrow magnetic tape and the air gap between the width w and the distance W as described above at a tape winding velocity of 15 m/sec.

FIGS. 5, 6 and 7 show the results of the inspection of the appearance of the end face of the VHS-format magnetic tape roll. The signs 0 on a line A in each of these drawings indicate the compressed air was not used, while the other signs A on a line B in each of the drawings indicate the compressed air was used. Ten specimens of the magnetic tapes were wound under each of different combinations of the conditions. The rate of the neat winding of the specimens was determined through its inspection. It was judged on the basis of 80% as a threshold as to whether or not the rate was good.

The magnetic coating liquid B was applied to the same film as that of the liquid A to manufacture the 8-mm video tapes under the same conditions as the VHS-format magnetic tapes. Ten specimens of the 8-mm tapes were wound under the same conditions as those of the VHS-format magnetic tapes. FIGS. 5, 6 and 7 show the results of the inspection of the appearance of the end face of the 8-mm tape roll.

It is understood from FIGS. 5, 6 and 7 that the appearance of the end face of the VHS-format tape roll of one-half inch in width was good (or not lower than the threshold of 80%) if the difference between the width w of the tape and the distance W between the inner surfaces of the flanges was about 2.0 mm by a line Bo1, and that the appearance of the end face of the 8-mm video tape roll was good (or not lower than the threshold of 80%) if the difference between the width w of the tape and the distance W between the inner surfaces of the flanges is about 1.3 mm shown by a line Bo2. This proved that the narrow magnetic tape was neatly wound on the reel if the width w of the tape and the distance W between the inner surfaces of the flanges were set in the relation of $W \leq w+0.16w$ and the velocity of the winding was set at 5 m/sec. or more. When the velocity of the winding was 3 m/sec., the appearance of the end face of the magnetic tape roll was good, but the side edge of the tape comes into contact with the inner surface of the flange to produce scrapings. Therefore, the velocity of 3 m/sec. was undesirable. When the width w of the narrow magnetic tape and the distance W were set in the relation of $W \leq w+0.16w$ and the compressed air was fed from the nozzle to the tape winding point near the reel, an appropriate air gap was formed between the side edge of the narrow magnetic tape and the inner surface of the flange to make it possible to wind the tape out of contact with the flange and render the appearance of the end face of the tape roll very good, even if the velocity of the winding was set at 5 m/sec.

What is claimed is:

1. A tape winding apparatus comprising: a tape winding member having a pair of upper and lower flanges, means for rotating said tape winding member for winding a magnetic tape on said tape winding member, and means for applying a magnetic field to said tape near said tape winding member so as to drive said tape in the direction of the width thereof while said tape is being wound on said tape winding member, the distance W between inner surfaces of said flanges and width w of said tape where said tape is wound on said tape winding member being in a relation of $W \leq w+0.16w$ and the speed of said winding being 5 m/sec or more, so as to keep the side edges of said tape out of contact with the inner surfaces of said flanges during said winding.

2. A tape winding apparatus comprising: a tape winding member having a pair of upper and lower flanges, means for rotating said tape winding member for winding a magnetic tape on said tape winding member, means for applying a magnetic field to said tape near said member so as to drive said tape in the direction of the width thereof while said tape is being wound on said tape winding member, the distance W between inner surfaces of said flanges and the width w of said tape where said tape is wound on said tape winding member being in a relation of $W \leq w+0.16w$ and means for feeding compressed air into tape winding point near said member and discharging air from side edges of said tape along inner surfaces of said flanges, so as to make an air gap between the inner surface of said flanges and the side edges of said tape while said tape is being wound on said tape winding member, so as to keep the side edges of said tape out of contact with the inner surfaces of said flanges while said tape is being wound on said tape winding member.

3. An apparatus according to claim 2 wherein said rotating means rotates said tape winding member at a speed such that said magnetic tape is wound on said tape winding member at a speed of said tape of no greater than 5 m/sec.

* * * * *